United States Patent
Lee (10) Patent No.: US 9,312,722 B2
(45) Date of Patent: Apr. 12, 2016

(54) SYSTEM AND METHOD FOR BATTERY POWER MANAGEMENT

(71) Applicant: FORD GLOBAL TECHNOLOGIES, LLC, Dearborn, MI (US)

(72) Inventor: Tae-Kyung Lee, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 147 days.

(21) Appl. No.: 14/273,602

(22) Filed: May 9, 2014

(65) Prior Publication Data

US 2015/0326038 A1  Nov. 12, 2015

(51) Int. Cl.
*H02J 7/00* (2006.01)

(52) U.S. Cl.
CPC .............. *H02J 7/007* (2013.01); *H02J 7/0052* (2013.01)

(58) Field of Classification Search
CPC .............................. H02J 7/0007; H02J 7/0052
USPC .......................................................... 320/134
See application file for complete search history.

(56) References Cited

U.S. PATENT DOCUMENTS

| | | | |
|---|---|---|---|
| 5,557,189 A * | 9/1996 | Suzuki | H01M 10/44 320/119 |
| 6,023,390 A * | 2/2000 | Kang | G11B 5/59627 360/77.04 |
| 7,518,339 B2 | 4/2009 | Schoch | |
| 2002/0015423 A1 * | 2/2002 | Rakib | H03M 13/256 370/485 |
| 2008/0046387 A1 * | 2/2008 | Gopal | G01D 4/004 705/412 |
| 2011/0051954 A1 * | 3/2011 | Thomsen | H03F 3/34 381/93 |
| 2011/0173585 A1 | 7/2011 | Hamano et al. | |
| 2012/0101674 A1 | 4/2012 | Wang et al. | |
| 2012/0105013 A1 | 5/2012 | Lin et al. | |
| 2012/0136594 A1 | 5/2012 | Tang et al. | |

OTHER PUBLICATIONS

J. Lee et al., Modeling and Real Time Estimation of Lumped Equivalent Circuit Model of a Lithium Ion Battery, IEEE Xplore Digital Library, two pages, 2006 <http://ieeexplore.ieee.org/xpl/login.jsp?reload=true&tp=&arnumber=4778621&url=http>.

* cited by examiner

*Primary Examiner* — M'Baye Diao
(74) *Attorney, Agent, or Firm* — David B. Kelley; Brooks Kushman P.C.

(57) ABSTRACT

A battery management system includes a battery pack and a controller. The controller is configured to receive pack terminal voltage and current data. In response, the controller may estimate battery model parameters in an equivalent circuit model and output state variable values indicative of fast and slow dynamics of the voltage responses. The controller may also output parameter values indicative of feedback gains to compute a current limit in a state feedback structure. The controller may further estimate battery current limits based on the state variable values and the feedback gains to control operation of the battery pack.

20 Claims, 7 Drawing Sheets

SYSTEM AND METHOD FOR BATTERY POWER MANAGEMENT

TECHNICAL FIELD

The present disclosure relates to battery management techniques capable of estimating parameters of a battery model for providing control of an associated battery.

BACKGROUND

Hybrid electric vehicles (HEV) utilize a combination of an internal combustion engine with an electric motor to provide motive power. This arrangement provides improved fuel economy over a vehicle that has only an internal combustion engine. One method of improving the fuel economy in a HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or in other cases such as when the battery state of charge (SOC) drops below a certain level, the engine must start quickly and smoothly in a manner that is nearly transparent to the driver.

The HEV includes a battery management system that estimates values descriptive of the battery pack and/or battery cell present operating conditions. The battery pack and/or cell operating conditions include battery SOC, power fade, capacity fade, and instantaneous available power. The battery management system should be capable of estimating values during changing cell characteristics as cells age over the lifetime of the pack. The precise estimation of some parameters may improve performance and robustness, and may ultimately lengthen the useful lifetime of the battery pack.

SUMMARY

A control system for a battery pack includes a controller that operates the pack within current limits derived from first and second state variable values and feedback gains. The first state variable values are based on pack terminal voltage and current data having frequency content greater than a threshold value. The second state variable values are based on pack terminal voltage and current data having frequency content less than the threshold value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed An HEV battery system may implement a battery management strategy that estimates values descriptive of the present operating condition of the battery and/or one or more battery cells. The battery pack and/or one or more cell operating conditions include battery state of charge, power fade, capacity fade, and instantaneous available power. The battery management strategy may be capable of estimating values as cells age over the lifetime of the pack. The precise estimation of some parameters may improve performance and robustness, and may ultimately lengthen the useful lifetime of the battery pack. For the battery system described herein, estimation of some battery pack and/or cell parameters can be realized as discussed below.

Figure 1:
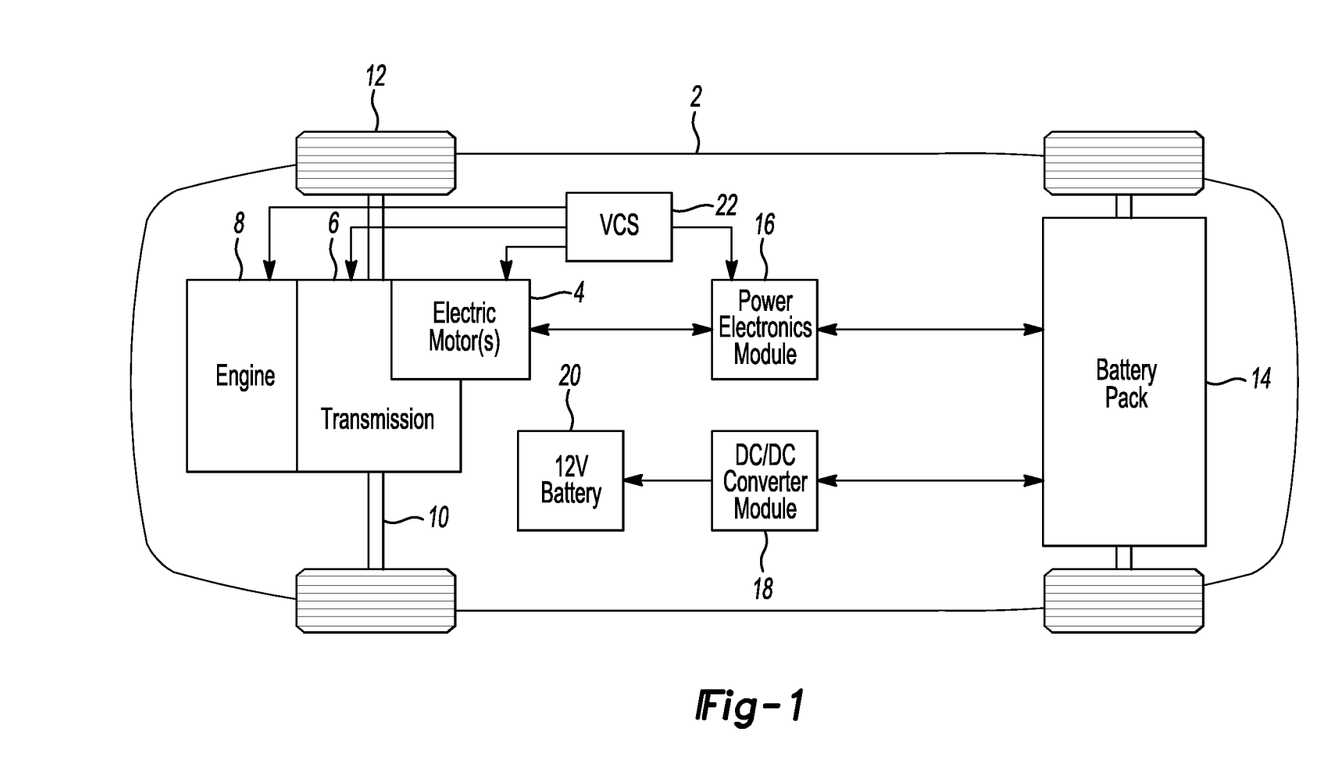
FIG. 1 is a schematic diagram of a hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 6. In addition, the hybrid transmission 6 is mechanically connected to an engine 8. The hybrid transmission 6 is also mechanically connected to a drive shaft 10 that is mechanically connected to the wheels 12. In another embodiment not depicted in the illustration, the hybrid transmission may be a non-selectable gear transmission that may include at least one electric machine. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

A battery pack 14 may include, but is not limited to, a traction battery having one or more battery cells that store energy which can be used by the electric motors 4. The vehicle battery pack 14 typically provides a high voltage DC output and is electrically connected to a power electronics module 16. The power electronics module 16 may communicate with one or more control modules that make up a vehicle computing system 22. The vehicle computing system 22 may control several vehicle features, systems, and/or subsystems. The one or more modules may include, but are not limited to, a battery management system. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

The battery pack 14 may be controlled by the power electronics module 16 which may receive commands from a vehicle computing system 22 having one or more control modules. The one or more control modules may include, but are not limited to, a battery control module. The one or more control modules may be calibrated to control the battery pack 14 using a battery model parameter estimation method which estimates an average sense of effective battery internal resistance during operation to determine battery power capability. The power capability prediction enables the battery pack 14 to prevent over-charging and over-discharging which could lead to reducing the life of the battery, performance issues with the vehicle powertrain, etc.

The battery parameter prediction method and/or strategy may assist in determining battery current limits and power capability in real-time (i.e., during operation). Many battery parameter estimation processes are affected by the fidelity of battery models and unpredicted environmental conditions or unexpected noises during battery operations. For example, if a battery is in a charge depleting mode, a simple battery model may not capture complicated system dynamics associated with voltage output and current input they are trying to measure. The vehicle battery measurement method/strategy may use the equivalent circuit model using one or more resistant-capacitor (RC) circuits in several configurations to measure the battery pack in the vehicle to obtain the electrochemical impedance during operation.

The calibration to control the battery pack may be accomplished using multiple tables to capture a wide frequency range that affects the impedance of the battery pack and its correlating dynamics. To populate/calibrate the multiple tables requires rigorous execution of offline testing of the battery pack in a test facility using complex algorithms. An example of offline testing of a battery pack is the Electrochemical Impedance Spectroscope (EIS) which may be implemented to capture the battery system characterization over wide frequency ranges that may include battery temperature, battery state of charge, and/or battery usage.

A vehicle battery measurement method may be implemented to eliminate the need of extensive offline testing. The vehicle battery measurement method may use one or more simple equivalent circuits to measure the battery pack in the vehicle to obtain the electrochemical impedance during operation. The on-board battery parameter estimation methods may have a higher level of noise compared to off-line parameter estimations, however they may provide valuable information regarding battery transient behavior during vehicle operation.

The HEV battery management system may implement the equivalent circuit model to predict battery performance using battery parameters for the next few seconds based on the battery measurements and the estimated electrochemical impedance. The estimated battery parameters may change depending on the driving conditions and electrified vehicle operating modes, such as charging sustaining mode, or charge depleting mode. The battery parameter estimation procedure using a simple equivalent circuit model tends to be sensitive to internal and external noises and environmental conditions.

A system may use the battery measurements to estimate the battery model parameters and subsequently to calculate battery power capability using the estimated model parameters. Battery power capability is affected by the impedance of the battery pack and its correlating dynamics. The battery model parameter estimation method may include battery measurement in the vehicle to obtain the electrochemical impedance with the use of an Extended Kalman Filter and other calculations/algorithms described in further detail below to calculate battery power capability. The power capability of a battery may be determined by state variables and may be inferred by using system inputs and outputs.

A model-based battery management system, based on equivalent circuit models, provides sufficient computation speed manageable in the battery management system without introducing additional hardware and/or increasing the system complexity. The characterization of the battery system may be calculated by real-time parameter estimation approaches on battery models using direct battery measurements in a HEV. The system may measure the battery current inputs and battery terminal voltage. The measurement values may be recorded, calculated, and stored in one or more control modules in the vehicle computing system including the battery energy control module.

Figure 2:
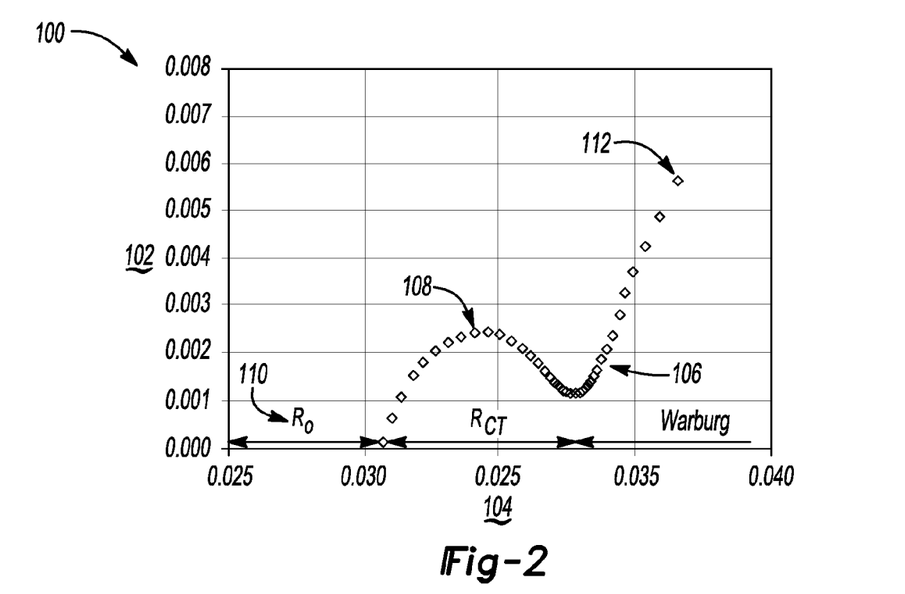
FIG. 2 is a graph illustrating an Electrical Impedance Spectroscopy Nyquist plot of battery impedance.

FIG. 2 is a graph 100 illustrating an EIS Nyquist plot of battery impedance with respect to frequency. The EIS Nyquist plot 100 illustrates a direct physical interpretation of the battery system using one equivalent circuit. The EIS Nyquist plot 100 has an x-axis representing real impedance 104 and a y-axis representing imaginary impedance 102. The curve 106 illustrates a measured impedance of the battery over a range of frequency responses. The range of frequency responses of the system may reveal the energy storage and dissipation properties of the battery.

The EIS Nyquist plot 100 may reveal information about the reaction mechanism of an electrochemical process for the battery including different reaction steps that may dominate at certain frequencies, and the frequency response may help to identify the rate limiting steps. The curve 106 may represent the slow battery dynamic response caused by diffusion processes at the solid particle of the electrode active materials and polarization processes across the cell thickness. The instantaneous responses are determined by an internal resistance term $R_0$ 110 of an equivalent circuit model of the battery. Battery dynamics represented by a medium-to-high frequency 108 mainly determine the power capability with the consideration of battery dynamics. The slow dynamics represented by a low frequency 112 (e.g., Warburg Impedance Term) and instantaneous dynamics represented by $R_0$ 110 are modeled as the real-time adjusting internal resistance in the equivalent circuit model. The graph 100 captures the battery dynamic responses that may be used to estimate instantaneous battery power capability of the battery system.

Figure 3:
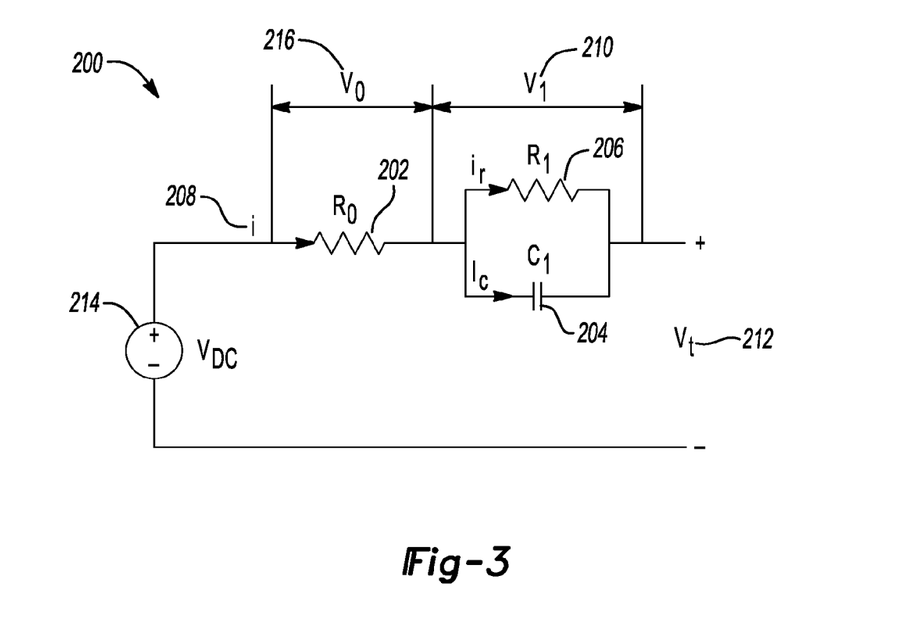
FIG. 3 is a schematic diagram of an equivalent circuit model using one RC circuit to model a battery.

FIG. 3 is a schematic of an equivalent circuit with one RC circuit to model a battery. The circuit may model a battery including a battery pack and/or one or more battery cells. The equivalent circuit model consists of an active electrolyte resistance (or internal resistance) $R_0$ 202, in series with the parallel capacitance $C_1$ 204, and an active charge transfer resistance $R_1$ 206. The battery dynamics and related state variables are expressed as the terminal voltage output $v_t$ 212, the battery open circuit voltage $v_{OC}$ 214, the voltage of the internal resistance $v_0$ 216, and the voltage of the RC circuit $v_1$ 210. The model may be implemented in a HEV battery management system to provide predictive computations for one or more battery parameters.

Figure 4:
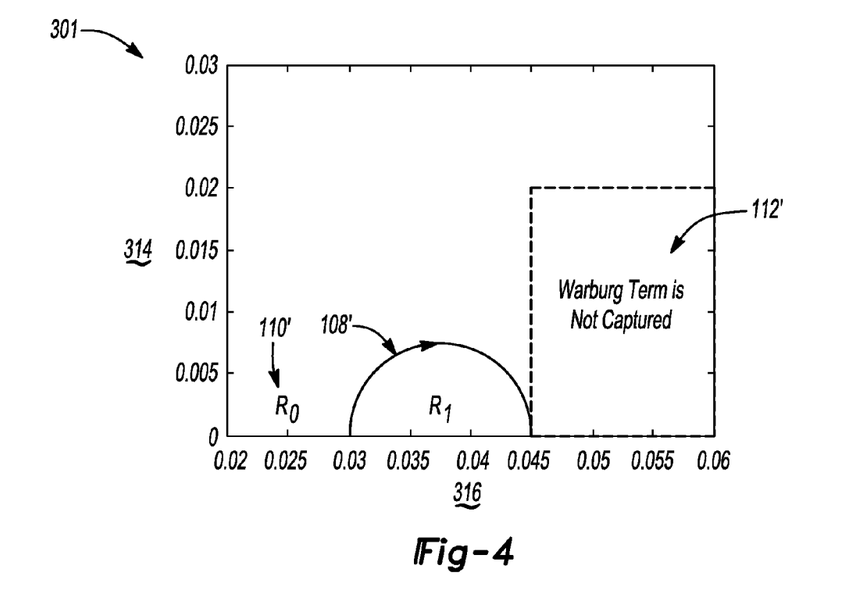
FIG. 4 is a graph illustrating frequency responses of the equivalent circuit model with one RC circuit in the Nyquist plot.

FIG. 4 is a graph 301 illustrating frequency responses of the equivalent circuit model with one RC circuit in the Nyquist plot. The x-axis 316 of the graph 301 represents a real part of the average battery impedance within a time window. The y-axis 314 of the graph 301 represents an imaginary part of the average electrical impedance for the cell. The medium-to-fast dynamics is represented by the semi-circuit 108' generated from the RC circuit (i.e., $R_1$ and $C_1$) and the internal resistance is related to $R_0$ 110'. However, the slow dynamics, called a Warburg term 112', is not captured by the equivalent circuit model with one RC circuit. Thus, slow dynamics, herein known as the Warburg term 112', may not effectively be represented in the one RC circuit model.

Figure 5:
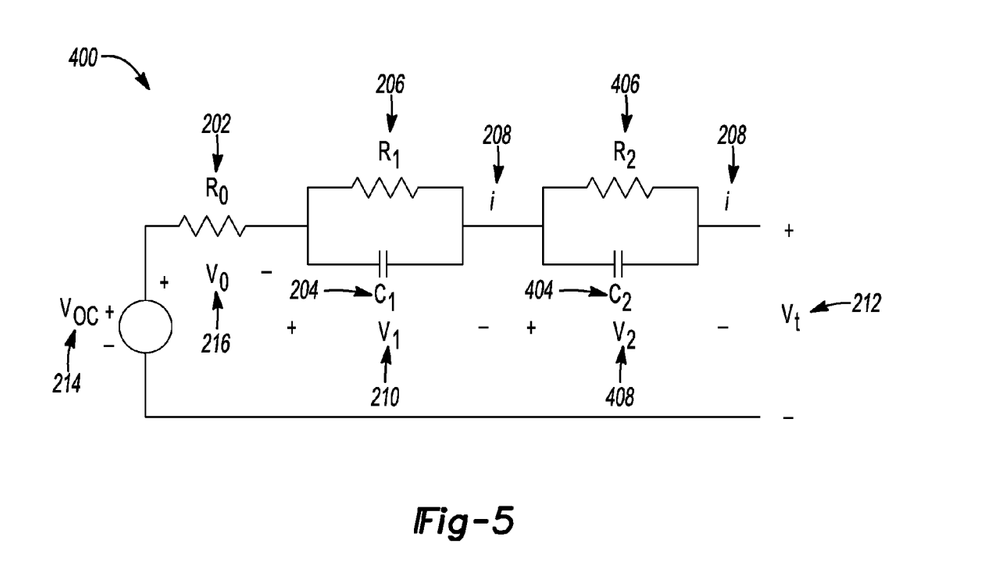
FIG. 5 is a schematic of an equivalent circuit model using two RC circuits to model a battery.

FIG. 5 is a schematic of a simple equivalent circuit model 400 using two RC circuits to model a battery according to an embodiment. The two RC circuits may improve the modeling 400 of the battery pack and/or one or more battery cells by introducing additional dynamics to the model. For instance, the slow dynamics term 112 may be modeled using an additional RC circuit. The RC circuit model may include an additional RC circuit having a resistor $R_2$ 406 and capacitor $C_2$ 404 in parallel of each other and in series with the RC circuit in the equivalent circuit model 200 as shown in FIG. 3. The equivalent circuit model may have other configurations not limited to one or two RC circuits. The equivalent circuit model may include, but is not limited to, two or more RC circuits to model the battery.

Figure 6:
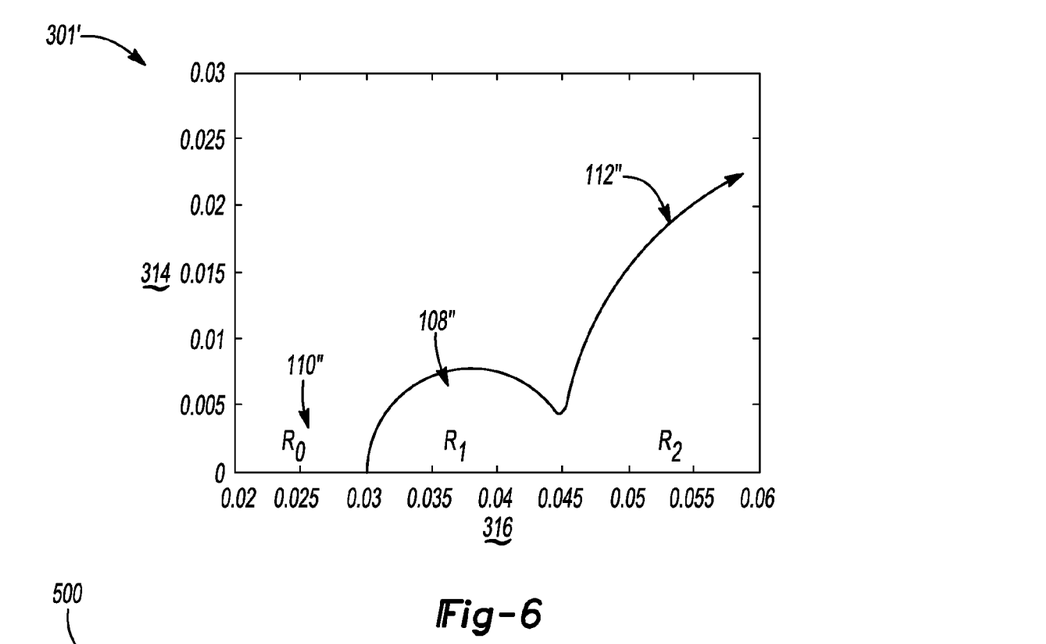
FIG. 6 is a graph illustrating the calculated battery impedance in the Nyquist plot using two RC circuits in the equivalent circuit model.

FIG. 6 is a graph 301' illustrating a calculation of an average internal resistance of one or more battery cells using two or more RC circuits in the equivalent circuit model according to an embodiment. The x-axis 316 of the graph 301' represents a real part of the average battery impedance within a time window. The y-axis 314 of the graph 301' represents an imaginary part of the average electrical impedance for the cell.

The graph 301' illustrates the system capturing the average internal resistance relying on high frequency 108" as a component of the electric impedance of the one or more cells. The system may capture the low frequency 112" component of the electric impedance of the one or more cells with the use of two or more RC circuits in the equivalent circuit model. The system may estimate the battery current limits and power capability with improved fidelity under wide frequency range operations, specifically for the vehicle operation case that the slow dynamics becomes a state of the battery operation.

For example, the medium-to-fast dynamics is represented by the semi-circuit 108" generated from the RC circuit (i.e., $R_1$ and $C_1$) and the internal resistance is related to $R_0$ 110". The slow dynamics, called a Warburg term 112", is captured by the equivalent circuit model with the additional RC circuit (i.e., $R_2$ and $C_2$). Thus, slow dynamics, herein known as the Warburg term 112", is demonstrated in the equivalent circuit model using two or more RC circuits.

A vehicle battery measurement method may implement the simple equivalent circuit model 400 using two RC circuits to capture fast and slow dynamics independently. The two RC circuits may improve prediction capability for low temperature and/or long continuous charging conditions. The Randles Circuit Model 200 as shown in FIG. 3 may not capture slow battery dynamics related to the Warburg Impedance Terms.

The two RC circuit may improve the modeling of the battery dynamics by capturing both low frequency and medium-to-high frequency responses using the following equations:

$$\dot{v}_1 = -\frac{1}{R_1 C_1} v_1 + \frac{1}{C_1} i \qquad (1)$$

where $v_1$ 210 is the voltage across the RC circuit which consists of resistance $R_1$ and capacitor $C_1$, the resistance $R_1$ 206 is an active charge transfer resistance, and i 208 is the current exciting the circuit. The RC circuit which consists of resistor $R_1$ and capacitor $C_1$ represents battery dynamic changing during vehicle operation. The RC circuit which consists of resistor $R_2$ and capacitor $C_2$ represents battery slow dynamics (i.e., low frequency) during vehicle operation using the following equation:

$$\dot{v}_2 = -\frac{1}{R_2 C_2} v_2 + \frac{1}{C_2} i \qquad (2)$$

where $V_2$ 210 is the voltage across the RC circuit which consists of $R_2$ 406 and $C_2$ 404, i 208 is the current exciting the circuit. The additional RC circuit having resistor $R_2$ 406 and capacitor $C_2$ represents low frequency during vehicle operation. The equivalent circuit model having two RC circuits may allow the calculation of the battery terminal voltage using the following equation:

$$v_t = v_{OC} - v_1 - v_2 - R_0 i \quad (3)$$

where $v_t$ 212 is the terminal voltage, $v_{OC}$ 214 is the battery open circuit voltage, $v_1$ 210 is the voltage across the RC circuit which consists of resistance $R_1$ and capacitor $C_1$, $v_1$ 210 is the voltage across the RC circuit which consists of $R_2$ 406 and $C_2$ 404, and $R_0$ 202 is the internal battery resistance. The voltage across the RC circuits may be calculated using the following equations:

$$v_1 = v_{1,0} e^{-\frac{1}{R_1 C_1} t} + \left(1 - e^{-\frac{1}{R_1 C_1} t}\right) R_1 i \quad (4)$$

$$v_2 = v_{2,0} e^{-\frac{1}{R_2 C_2} t} + \left(1 - e^{-\frac{1}{R_2 C_2} t}\right) R_2 i \quad (5)$$

The battery terminal voltage estimation with multiple RC equivalent circuit models is derived as the following equation:

$$v_t = v_{OC} - v_{1,0} e^{-\frac{1}{R_1 C_1} t} - v_{2,0} e^{-\frac{1}{R_2 C_2} t} - \left(R_0 + \left(1 - e^{-\frac{1}{R_1 C_1} t}\right) R_1 + \left(1 - e^{-\frac{1}{R_2 C_2} t}\right) R_2\right) i \quad (6)$$

where t is time.

The system may linearize the battery terminal voltage response at current time $t_0$ (e.g., t is equal to zero) to obtain a generalized state feedback structure for estimating the battery current limits as the following equation:

$$v_t = v_t|_{t=0} + \frac{dv_t}{dt}\bigg|_{t=0} t \quad (7)$$

where equation (7) is as followed:

$$\frac{dv_t}{dt}\bigg|_{t=0} = \frac{v_{1,0}}{R_1 C_1} + \frac{v_{2,0}}{R_2 C_2} - \left(\frac{1}{C_1} + \frac{1}{C_2}\right) i \quad (8)$$

where equation (8) represents the voltage change rate, and it is derived by setting t=0 at the following equation:

$$\frac{dv_t}{dt} = \frac{v_{1,0}}{R_1 C_1} e^{-\frac{1}{R_1 C_1} t} + \frac{v_{2,0}}{R_2 C_2} e^{-\frac{1}{R_2 C_2} t} - \left(\frac{1}{C_1} e^{-\frac{1}{R_1 C_1} t} + \frac{1}{C_2} e^{-\frac{1}{R_2 C_2} t}\right) i \quad (9)$$

Figure 7:
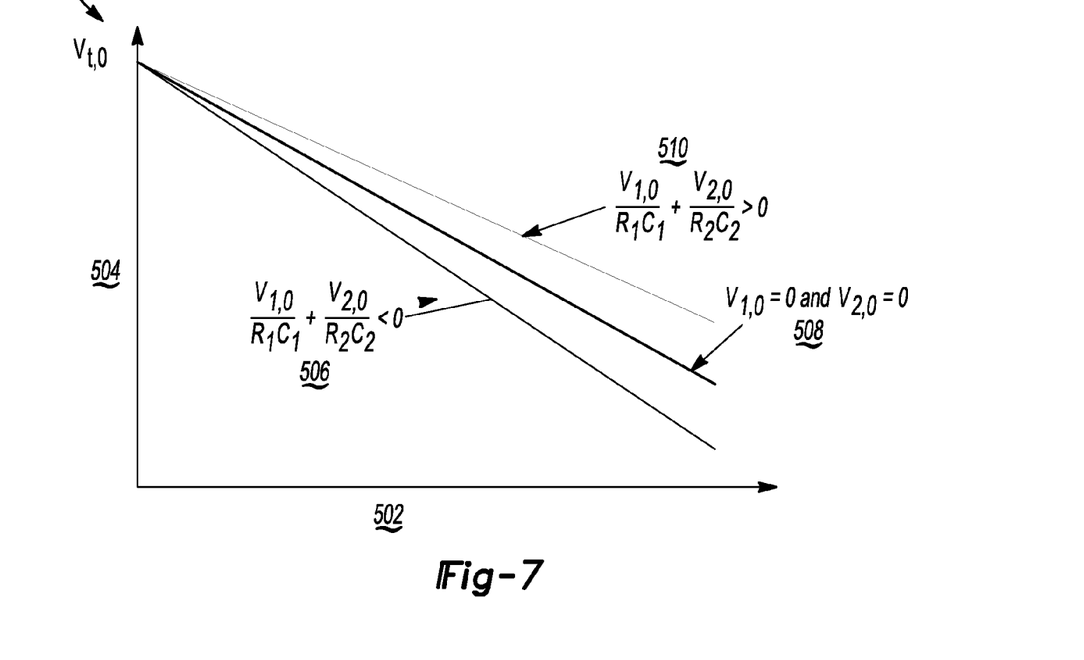
FIG. 7 is a graph illustrating terminal voltage responses of the battery depending on the values of state variables from different battery usage profiles.

FIG. 7 illustrates the terminal voltage dependency on the estimated battery states of $v_{1,0}$ and $v_{2,0}$ in the equivalent circuit model. When the battery input currents are the same value between $v_{1,0}$ and $v_{2,0}$, the voltage response with equal input current 508 are directly affected by $$\frac{v_{1,0}}{R_1 C_1} + \frac{v_{2,0}}{R_2 C_2}$$

in eqn. (8).

When the voltage response $$\frac{v_{1,0}}{R_1 C_1} + \frac{v_{2,0}}{R_2 C_2}$$

is positive, the voltage change rate moves to the positive direction 510. The voltage response with respect to time and having positive input current 510 is located above the voltage response without consideration of battery internal dynamics (i.e., with equal input current 508 having $v_{1,0}=0$ and $v_{2,0}=0$).

When the voltage response $$\frac{v_{1,0}}{R_1 C_1} + \frac{v_{2,0}}{R_2 C_2}$$

is negative, the voltage change rate moves to the negative direction 506. The voltage response with respect to time and having a negative input current 506 is located below the voltage response without consideration of battery internal dynamics (i.e., with equal input current 508 having $v_{1,0}=0$ and $v_{2,0}=0$).

The current limits during the time duration $\Delta t = t_d$ at a current SOC and current states of $v_{1,0}$ and $v_{2,0}$ may be derived by setting the time duration $\Delta t = t_d$ in eqn. (7)

Combining eqn. (7) and eqn. (9) while setting $\Delta t = t_d$ may derive the following equation:

$$v_t = v_{OC} - \left(1 - \frac{1}{R_1 C_1}\right) v_{1,0} - \left(1 - \frac{1}{R_2 C_2}\right) v_{2,0} - \left(R_0 + \left(\frac{1}{C_1} + \frac{1}{C_2}\right) t_d\right) i \quad (10)$$

The battery discharge current limit $i_{dch,lim}$ is computed from eqn. (10) by setting $v_t = v_{lb}$, where $V_{lb}$ is the battery low voltage limit, expressed in the following equation:

$$i_{dch,max} = \left[(v_{OC} - v_{lb}) - \left(1 - \frac{1}{R_1 C_1}\right) v_{1,0} - \left(1 - \frac{1}{R_2 C_2}\right) v_{2,0}\right] / \left(R_0 + \left(\frac{1}{C_1} + \frac{1}{C_2}\right) t_d\right). \quad (11)$$

Equation (11) is converted to a state feedback form expressed in the following equations:

$$i_{dch,max} = K_0(v_{OC} - v_{lb}) - K_1 v_{1,0} - K_2 v_{2,0} \quad (12)$$

$$\text{where } K_0 = 1 / \left(R_0 + \left(\frac{1}{C_1} + \frac{1}{C_2}\right) t_d\right), \quad (13a)$$

$$\text{where } K_1 = \left(1 - \frac{1}{R_1 C_1}\right) / \left(R_0 + \left(\frac{1}{C_1} + \frac{1}{C_2}\right) t_d\right), \quad (13b)$$

$$\text{where } K_2 = \left(1 - \frac{1}{R_2 C_2}\right) / \left(R_0 + \left(\frac{1}{C_1} + \frac{1}{C_2}\right) t_d\right). \quad (13c)$$

The feedback gains are expressed as functions of battery model parameters in equations (13a), (13b), and (13c), which may be estimated by an Extended Kalman filter or other known estimating approaches.

Figure 8:
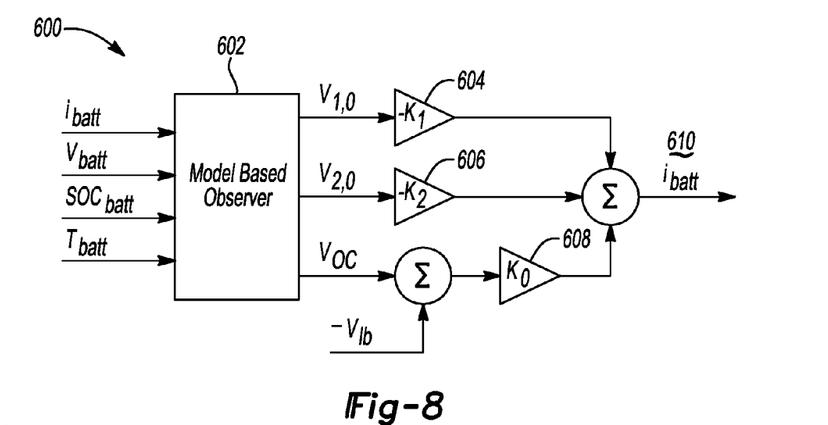
FIG. 8 is a generalized state feedback structure used to estimate battery current limits.

FIG. 8 is a generalized state feedback structure 600 expressed in eqn. (12) used to estimate battery parameters with the use of feedback gains 604, 606, 608. The generalized state feedback structure 600 may include a model based observer 602 using a Kalman Extended Filter.

The battery charge current limit $i_{chg,lim}$ is computed from eqn. (10) by setting $v_t = v_{ub}$, where $v_{ub}$ is the battery high voltage limit. The battery discharge current limit $i_{dchg,lim}$ is computed from eqn. (10) by setting $v_t = v_{lb}$, where $v_{lb}$ is the battery low voltage limit. The battery charge current limit 610 using the generalized state feedback gains 604, 606, 608 is expressed in the following equation:

$$i_{ch,max} = K_0(v_{OC} - v_{ub}) - K_1 v_{1,0} - K_2 v_{2,0}. \tag{14a}$$

$$i_{dch,max} = K_0(v_{OC} - v_{lb}) - K_1 v_{1,0} - K_2 v_{2,0} \tag{14b}$$

where equation (14b) is show as an example of the state feedback structure 600 in FIG. 8. If additional RC circuits are used in the battery equivalent circuit model, the same procedure may be used to obtain additional feedback gains $K_j$, for additional state variables $v_j$. Thus, the discharge and charge current limits using two or more RC circuits are expressed in the following equations:

$$i_{dch,max} = K_0(v_{OC} - v_{lb}) - K_1 v_{1,0} - \ldots - K_n v_{n,0}, \tag{15a}$$

$$i_{ch,max} = K_0(v_{OC} - v_{ub}) - K_1 v_{1,0} - \ldots - K_n v_{n,0}. \tag{15b}$$

The battery management system to calculate battery model parameters may allow the flexibility in extending the number of state variables and the concise feedback form of current limit estimation structure. Once the model parameters are identified off-line or on-line, the feedback gains may be calculated. After the feedback gains are calculated, the battery current limits are computed.

The feedback gains $K_0$, $K_1$, and $K_2$ may be modified in order to account for possible noises and errors, and to improve the robustness in estimating the current limits expressed in the following equation:

$$K_0 = \alpha_0 \bigg/ \left( R_0 + \left( \frac{1}{C_1} + \frac{1}{C_2} \right) t_d \right), \tag{16a}$$

$$K_1 = \alpha_1 \left( 1 - \frac{1}{R_1 C_1} \right) \bigg/ \left( R_0 + \left( \frac{1}{C_1} + \frac{1}{C_2} \right) t_d \right), \tag{16b}$$

$$K_2 = \alpha_2 \left( 1 - \frac{1}{R_2 C_2} \right) \bigg/ \left( R_0 + \left( \frac{1}{C_1} + \frac{1}{C_2} \right) t_d \right), \tag{16c}$$

where $\alpha_0$, $\alpha_1$ and $\alpha_2$ are tuning parameters of the feedback gains respectively.

The battery model parameters may be calibrated off-line, or estimated in real time. If real-time model parameter estimation is used, an EKF may be used. The EKF for estimating model parameters and state variables is formulated through the following procedure expressed in the following equation:

$$\hat{x}_{k|k-1} = f(\hat{x}_{k-1|k-1}, u_{k-1}) \tag{17}$$

where $\hat{x}_{k-1|k-1}$ is the augmented state vector and $u_{k-1}$ is the input current.

The input current $u_k$ is transmitted to the algorithm at the specific operating point to allow the system to predict the battery parameters at that time variant. The model parameters are used to predict the voltage response when a constant current is applied during a time period. Based on the equations above, and the EKF know variables, the updated filter equation may now predict the next state of the battery power capabilities using the predict covariance equations as followed:

$$F_{k-1} = \frac{\partial f}{\partial x} \bigg|_{\hat{x}_{k-1|k-1}, u_{k-1}} \tag{18a}$$

$$P_{k|k} = \text{cov}(x_k - \hat{x}_{k|k}) = E\big((x_k - \hat{x}_{k|k})(x_k - \hat{x}_{k|k})^T\big) \tag{18b}$$

$$P_{k|k-1} = \text{cov}(x_k - \hat{x}_{k|k-1}) = E\big((x_k - \hat{x}_{k|k-1})(x_k - \hat{x}_{k|k-1})^T\big) \tag{18c}$$

$$P_{k|k-1} = F_{k-1} P_{k-1|k-1} F_{k-1}^T + Q_k \tag{19}$$

The difference between the new measurement value $y_k$ and the predicted value $h(\hat{x}_{k|k-1})$ is computed using the following equation:

$$\tilde{y}_k = y_k - h(\hat{x}_{k|k-1}) \tag{20}$$

The following equation is the intermediate to determine the Kalman gain $K_k$ as expressed in the following equation:

$$S_k = H_k P_{k|k-1} H_k^T + R_k \tag{21}$$

The equation used to determine the Kalman gain $K_k$ is expressed in the following equation:

$$K_k = P_{k|k-1} H_k^T S_k^{-1} \tag{22}$$

where the Kalman gain determines an update state vector $\hat{x}_{k|k}$ from the $K_k \tilde{y}$ as expressed in the following equation:

$$\hat{x} = \hat{x}_{k|k-1} + K_k \tilde{y}_k \tag{23}$$

The covariance of a state estimation error is in the following equation:

$$P_{k|k} = (I - K_k H_k) P_{k|k-1} \tag{24}$$

The model parameters are estimated from equation (24).

The system may calculate the battery instantaneous power capabilities during a charge event using the following equation:

$$P_{lim} = |i_{chg,max}| v_{ub} \tag{25}$$

where $P_{lim}$ is the power capability, $v_{ub}$ is the battery upper voltage limit, and $i_{min}$ is the absolute minimum current.

The system may calculate the battery instantaneous power capabilities during a discharging event using the following equation:

$$P_{lim} = |i_{dch,max}| v_{lb} \tag{26}$$

where $P_{lim}$ is the power capability, $v_{lb}$ is the battery lower voltage limit, and $i_{max}$ is the maximum current.

Figure 9:
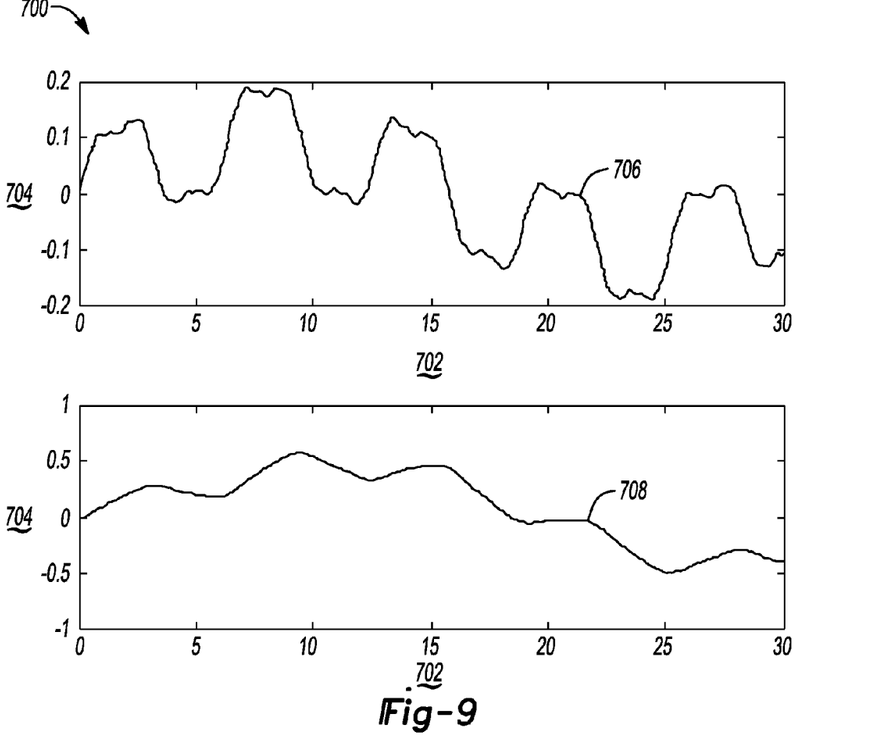
FIG. 9 are graphs illustrating estimated voltage responses of state variables in the equivalent circuit using two RC circuits during vehicle operation.

FIG. 9 are graphs 700 illustrating responses of the internal state variables of the equivalent circuit battery model. The graphs have an x-axis 702 representing time in seconds and a y-axis 704 representing measured voltage. Different frequency dynamics are captured respectively by the first RC circuit $v_1$ 706 and the second RC circuit $v_2$ 708. The voltage $v_1$ 706 may represent the fast dynamics, and the voltage $v_2$ 708 may represent the slow dynamics. The voltage responses may be used to estimate battery current limits, battery power capability, and other battery performance variables.

Figure 10:
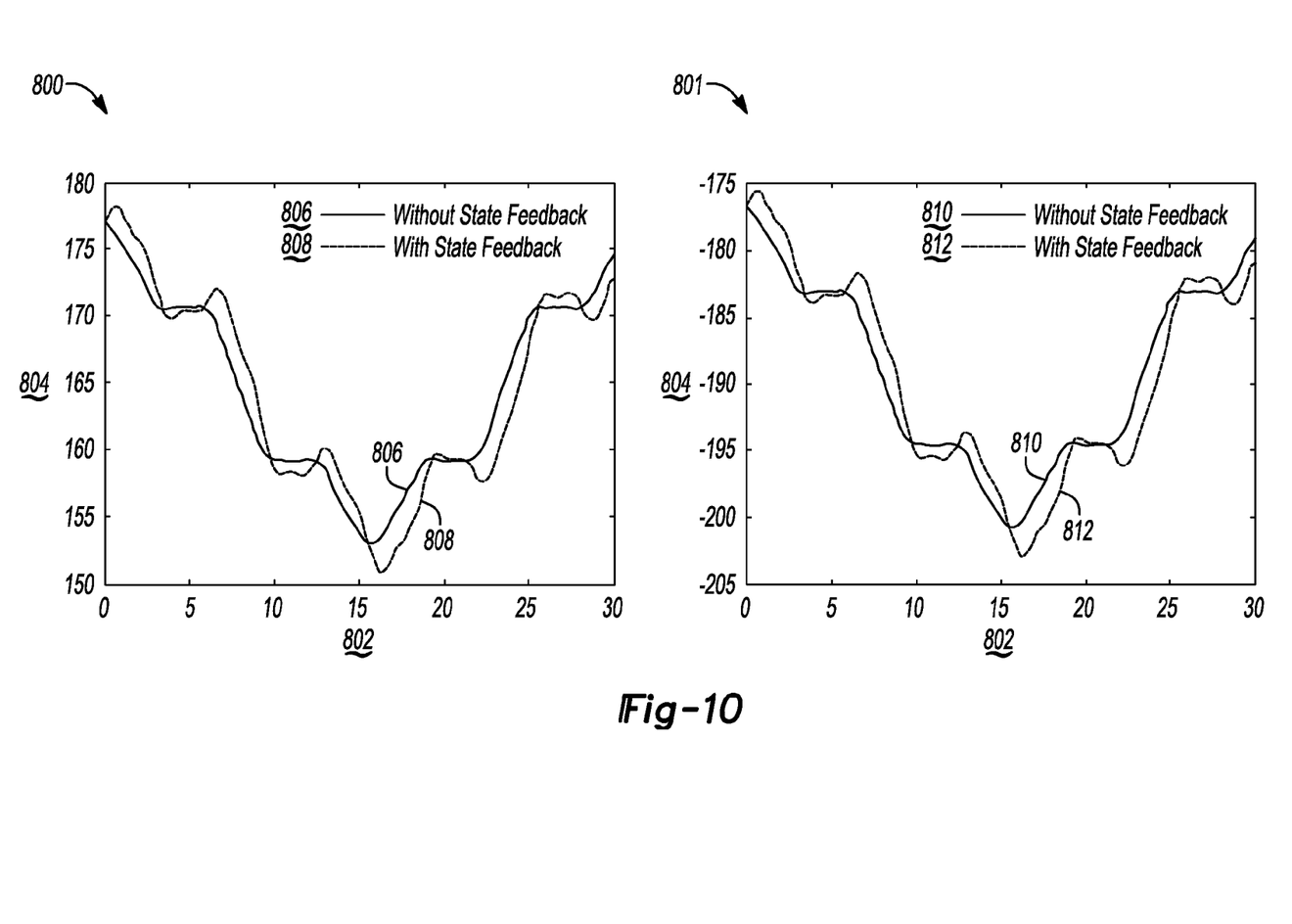
FIG. 10 are graphs illustrating a current limit estimated by the proposed state feedback structure.

FIG. 10 are graphs 800, 801 illustrating a current limit with the use of a state feedback structure. The graphs 800, 801 having an x-axis 802 representing time in seconds and a y-axis 804 representing current in amperes. The graphs 800, 801 display the maximum charge and discharge current with and without the state feedback structure.

The maximum discharge current graph 800 illustrates a current limit that may improve battery parameter modeling with the use of a state feedback structure. The maximum discharge current with the state feedback 808 may have an improved calculation of the current limit compared to the maximum discharge current without the state feedback 806.

The maximum charge current graph 801 illustrates a current limit that may improve battery parameter modeling with the use of a state feedback structure. The maximum charge current with the state feedback 812 may have an improved calculation of the current limit compared to the maximum discharge current without the state feedback 810.

Figure 11:
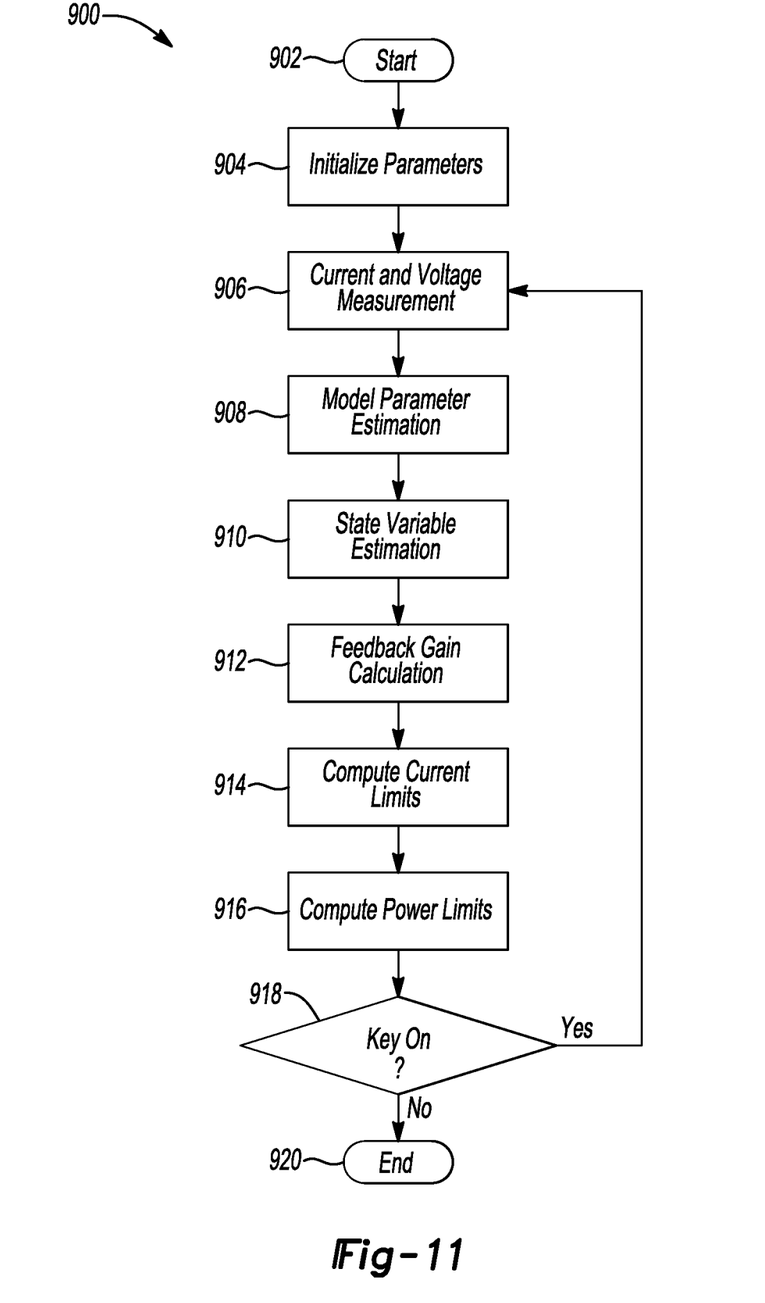
FIG. 11 is a flow chart of an algorithm for estimating battery current limits and power limits in a battery management system.

FIG. 11 is a flow chart of an algorithm for a method 900 of estimating battery current limits and power limits in a battery management system according to an embodiment. The method 900 is implemented using software code contained within the vehicle control module, according to one or more embodiments. In other embodiments, the method 900 is implemented in other vehicle controllers, or distributed amongst multiple vehicle controllers.

Referring again to FIG. 11, the vehicle and its components illustrated in FIG. 1, FIG. 3, FIG. 5, and FIG. 8 are referenced throughout the discussion of the method 900 to facilitate understanding of various aspects of the present disclosure. The method of estimating the battery performance variables using a state feedback structure to determine current limits and power limits, in the hybrid electric vehicle may be implemented through a computer algorithm, machine executable code, or software instructions programmed into a suitable programmable logic device(s) of the vehicle, such as the vehicle control module, the hybrid control module, another controller in communication with the vehicle computing system, or a combination thereof. Although the various steps shown in the flowchart diagram appear to occur in a chronological sequence, at least some of the steps may occur in a different order, and some steps may be performed concurrently or not at all.

At step 902, during a key-on event which allows the vehicle to be powered on, the vehicle computing system may begin powering up the one or more modules. The powering up of the one or more modules may cause variables related to the battery management system to initialize before enabling one or more algorithms used to control the battery at step 904.

The initialized parameters may be predetermined values or stored values at the last key off event. Before enabling the algorithms at a key-on event, the parameters should be initialized. For example, the battery management method may initialize several variables including, but not limited to, the battery terminal voltage, current limits, and/or other battery related parameters.

At 906, the system may measure the battery voltage outputs and current inputs using several types of sensors in real time. Once the system has received the battery voltage responses and current measurements, the system may process the received signals to calculate battery state variables, represented by voltage responses based on the fast and slow dynamics of the battery.

The model parameter estimation of fast and slow dynamic voltage responses may be measured using two or more RC circuits in an equivalent circuit mode at step 908. An EKF may be used for model parameter estimation. The model parameter estimation based on the EKF is achieved using equations (17)-(24). Other on-line parameter estimation approaches may be used if model parameters can be identified in real-time. Off-line calibrated model parameter maps can be used if on-line parameter estimation approaches are not used in a battery management system.

At step 910, the system may estimate the state variables. The state variables include the battery open circuit voltage $v_{OC}$ 216, voltage across the RC circuit $v_1$ 210 which consists of the fast dynamics voltage responses, and voltage across the second RC circuit $v_2$ 408 which consists of the slow dynamics voltage responses. The open circuit voltage $v_{OC}$ 216 may be estimated based on the battery state of charge, which may be computed by the current integration or other algorithms.

In another embodiment, step 908 and step 910 may be combined as a single step done by the system. For instance, the estimation process may include battery model parameters and state variables in one estimation structure, so called "parameter state co-estimation". In this embodiment, the different time scales in parameter changes and state chances may cause some deterioration in estimation performance, but the estimation structure may be a simpler model calculated by the system. However, separating the state variable estimation procedure with the estimation of the model parameter may allow the system to improve the estimation accuracy at each state variable and model parameter.

At step 912, the feedback gains are calculated by equations (13a), (13b) and (13c). The feedback gains may be calculated by equations (16a), (16b) and (16c) to improve the robustness in estimating the current limits, when possible measurement and process noises and errors need to be dampened.

At step 914, the system may compute current limits using the state feedback structure for fast dynamics, slow dynamics, and the battery open circuit voltage as stated in equations (14a) and (14b). If additional RC circuits are used in the battery equivalent circuit model, the discharge and charge current limits using two or more RC circuits are expressed in equations (15a) and (15b).

At step 916, the system may calculate power limits using equations (25) and (26). The calculated power limits may be used to determine the battery current commands from the battery controller to the battery pack.

At step 918, if the system detects a key-off event, the system may end the one or more algorithms used to manage the battery pack and/or the one or more battery cells. The vehicle computing system may have a vehicle key-off mode to allow the system to store one or more parameters in non-volatile memory such that these parameters may be used by the system for the next key-on event at step 920.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery management system comprising:
    a battery pack; and
    at least one controller programmed to operate the pack within current limits derived from first and second state variable values and feedback gains, wherein the first state variable values are based on pack terminal voltage and current data having frequency content greater than a threshold value and the second state variable values are based on pack terminal voltage and current data having frequency content less than the threshold value.

2. The system of claim 1, wherein the feedback gains are based on impedance parameters defining an equivalent circuit model of the pack.

3. The system of claim 2, wherein the equivalent circuit model includes two or more RC circuits.

4. The system of claim 1, wherein the current limits include a discharge current limit and a charge current limit.

5. The system of claim 1, wherein the at least one controller is further programmed to, during a charge or discharge event, operate the pack within power limits including an instantaneous power capability derived from the pack terminal voltage and current data.

6. The system of claim 1, wherein the at least one controller is further programmed to, during a charge or discharge event, operate the pack within power limits including a continuous power capability derived from the pack terminal voltage and current data.

7. The system of claim 1, wherein the at least one controller is further programmed to, during a charge or discharge event, operate the pack within power limits having predefined duration.

8. A method for controlling a battery pack comprising:
outputting first state variable values based on pack terminal voltage and current data having frequency content greater than a threshold value and second state variable values based on pack terminal voltage and current data having frequency content less than the threshold value;
outputting feedback gains associated with the first and second state variable values based on impedance parameters defining an equivalent circuit model of the pack;
outputting current limits for the pack based on the feedback gains and the first and second state variable values; and
operating the pack based on the limits.

9. The method of claim 8, wherein the equivalent circuit model includes two or more RC circuits.

10. The method of claim 8, wherein the current limits include a discharge current limit and a charge current limit.

11. The method of claim 8 further comprising, during a charge or discharge event, operating the pack within power limits including an instantaneous power capability derived from the pack terminal voltage and current data.

12. The method of claim 8 further comprising, during a charge or discharge event, operating the pack within power limits including a continuous power capability derived from the pack terminal voltage and current data.

13. The method of claim 8 further comprising, during a charge or discharge event, operating the pack within power limits having predefined duration.

14. A control system for a battery pack comprising:
a controller programmed to operate the pack within current limits derived from first and second state variable values and feedback gains, wherein the first state variable values are based on pack terminal voltage and current data having frequency content greater than a threshold value and the second state variable values are based on pack terminal voltage and current data having frequency content less than the threshold value.

15. The system of claim 14, wherein the feedback gains are based on impedance parameters defining an equivalent circuit model of the pack.

16. The system of claim 15, wherein the equivalent circuit model includes two or more RC circuits.

17. The system of claim 14, wherein the current limits include a discharge current limit or a charge current limit.

18. The system of claim 14, wherein the controller is further programmed to, during a charge or discharge event, operate the pack within power limits including an instantaneous power capability derived from the pack terminal voltage and current data.

19. The system of claim 14, wherein the controller is further programmed to, during a charge or discharge event, operate the pack within power limits including a continuous power capability derived from the pack terminal voltage and current data.

20. The system of claim 14, wherein the controller is further programmed to, during a charge or discharge event, operate the pack within power limits having predefined duration.

* * * * *